US009754225B2

(12) United States Patent
Worwetz et al.

(10) Patent No.: US 9,754,225 B2
(45) Date of Patent: Sep. 5, 2017

(54) AUTOMATED RISK ASSESSMENT AND MANAGEMENT

(75) Inventors: Mark Worwetz, Amherst, NY (US); Volker Gunnar Scheuber-Heinz, Pleasant Grove, UT (US); Brent Thurgood, Spanish Fork, UT (US); Jon Hardman, Springville, UT (US)

(73) Assignee: Micro Focus Software Inc., Provo, UT (US)

( * ) Notice: Subject to any disclaimer, the term of this patent is extended or adjusted under 35 U.S.C. 154(b) by 467 days.

(21) Appl. No.: 13/053,503

(22) Filed: Mar. 22, 2011

(65) Prior Publication Data

US 2011/0231221 A1    Sep. 22, 2011

Related U.S. Application Data

(60) Provisional application No. 61/316,298, filed on Mar. 22, 2010.

(51) Int. Cl.
G06Q 10/00     (2012.01)
G06Q 10/06     (2012.01)

(52) U.S. Cl.
CPC .......... *G06Q 10/06* (2013.01); *G06Q 10/063* (2013.01); *G06Q 10/0635* (2013.01)

(58) Field of Classification Search
CPC .. G06Q 10/06; G06Q 10/063; G06Q 10/0635; G06F 21/577; G06F 11/3447; H04L 63/1433
See application file for complete search history.

(56) References Cited

U.S. PATENT DOCUMENTS

| | | | |
|---|---|---|---|
| 7,533,798 B2 | 5/2009 | Jones et al. | |
| 7,552,480 B1 * | 6/2009 | Voss | 726/25 |
| 7,752,125 B1 | 7/2010 | Kothari et al. | |
| 7,788,150 B2 | 8/2010 | Molloy et al. | |
| 2003/0046128 A1 * | 3/2003 | Heinrich | 705/7 |
| 2004/0225952 A1 * | 11/2004 | Brown et al. | 714/819 |
| 2005/0256965 A1 * | 11/2005 | Hohmann et al. | 709/230 |
| 2005/0278786 A1 | 12/2005 | Tippett et al. | |
| 2006/0061595 A1 * | 3/2006 | Goede et al. | 345/619 |
| 2007/0067847 A1 * | 3/2007 | Wiemer et al. | 726/25 |
| 2009/0070170 A1 | 3/2009 | Krishnamurthy | |
| 2010/0199181 A1 * | 8/2010 | Robertson et al. | 715/709 |

OTHER PUBLICATIONS

Kim A., Luo J., Kang M. (2005) Security Ontology for Annotating Resources. In: Meersman R., Tari Z. (eds) On the Move to Meaningful Internet Systems 2005: CoopIS, DOA, and ODBASE. OTM 2005. Lecture Notes in Computer Science, vol. 3761. Springer, Berlin, Heidelberg.*

* cited by examiner

*Primary Examiner* — William Brockington, III
(74) *Attorney, Agent, or Firm* — Schwegman Lundberg & Woessner, P.A.

(57) ABSTRACT

Automated risk assessment and management techniques are provided. Assets of an enterprise are monitored within an enterprise repository via their electronic identities. The identities are annotated with business defined values. The annotations can dynamically change based on dynamic policy evaluation and evolving actions of the assets, the state of the enterprise, and/or the state of an enterprise system. The annotations are accumulated and used in customized calculations for purposes of driving automated actions of the enterprise and producing a variety of reporting features.

9 Claims, 3 Drawing Sheets

AUTOMATED RISK ASSESSMENT AND MANAGEMENT

RELATED APPLICATIONS

The present application claims the benefit of and is a non-provisional application of U.S. Provisional Patent Application Ser. No. 61/316,298, filed on Mar. 22, 2010, and entitled "Automated Risk Assessment and Management," the disclosure of which is incorporated by reference in its entirety herein.

BACKGROUND

In less than a few decades the manner in which organizations conduct business from top to bottom has been transformed. Even the smallest of businesses now rely on technology almost exclusively to track, monitor, plan, and conduct business.

In fact, many organizations have accumulated a wealth of information about themselves and their customers in data warehouses. This information is often indexed and mined to produce reports, generate marketing campaigns, and dynamically drive actions of the organizations.

With this level of automation a variety of problems have emerged that was previously not very prevalent. One particular area of concern is security because physical assets, such as machines, and electronic assets, such as confidential information, can be accessed, breached, and compromised remotely and sometimes anonymously. Additionally, one of the biggest threats to the assets of an enterprise comes from rogue employees of the enterprise misusing enterprise assets.

When an organization finds and plugs one security hole in their electronic systems another one more difficult to plug emerges. Additionally, more often than not security improvements are the result of hindsight evaluation meaning that an organization has to endure a security issue before an improvement to security takes place.

Generally, an organization's security and business decisions are reactive to correct known issues rather than proactive to identify and prevent problems before those problems ever have a chance to occur.

SUMMARY

Various embodiments of the invention provide techniques for automated risk assessment and management. Specifically, a method for providing an automated risk assessment and management infrastructure is presented.

Base annotations are assigned to an asset identity associated with an asset in an enterprise data store. Next, a predefined number of iterations are preformed; each iteration calculating new annotations based at least in part on prior annotations and the new annotations assigned to the asset identity in the enterprise data store. For the first iteration, the base annotations are the prior level annotations. Finally, the enterprise data store for the asset identity is monitored based on the base annotations and the new annotations to perform one or more automated actions.

DETAILED DESCRIPTION

Figure 1:
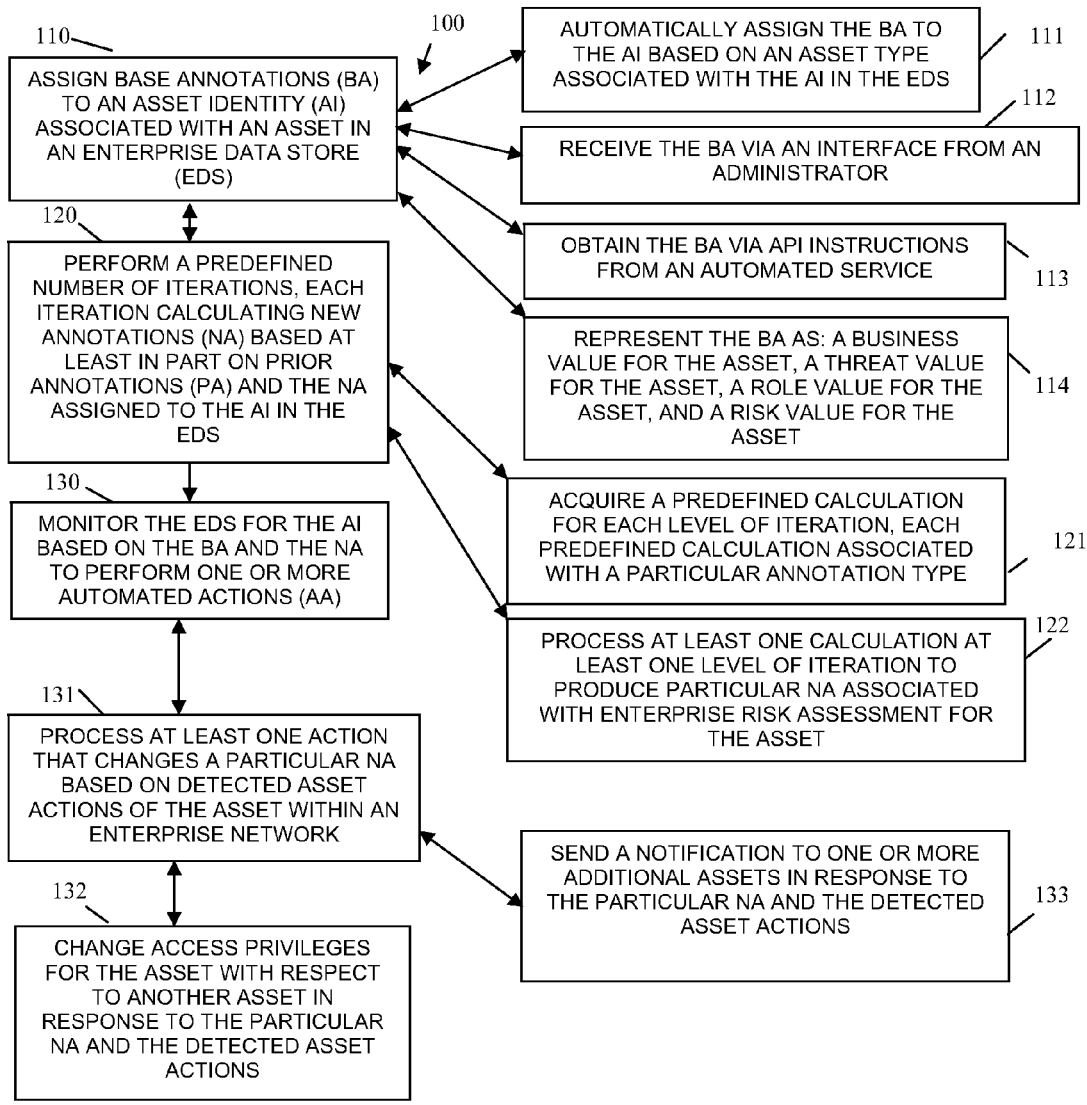
FIG. 1 is a method for providing an automated risk assessment and management infrastructure, according to the techniques presented herein.

A "resource" includes a user, service, system, device, directory, data store, groups of users, a workflow, a workload, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

As used herein the term "resource" may be used synonymously and interchangeably with the term "asset."

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

As used herein, an "annotation" refers to metadata information that is tagged or associated with primary data, such as an identity of a resource. In an embodiment, the annotation can occur in name-value pairs where the name refers to a type of annotation and the value is a specific instance or assignment for the type of annotation. For example, suppose a resource is an asset of an organization, such as a server machine or even an employee. The primary data for the resource is its identity and an example annotation may appear as "BV=1" where BV is a name for "business value" to the organization and "1" is an assignment value indicating that the business value is high, given a predefined scale of 1-N with 1 being the highest and N being the lowest.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® operating system products, directory-based products, cloud-computing-based products, workload management products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Figure 2:
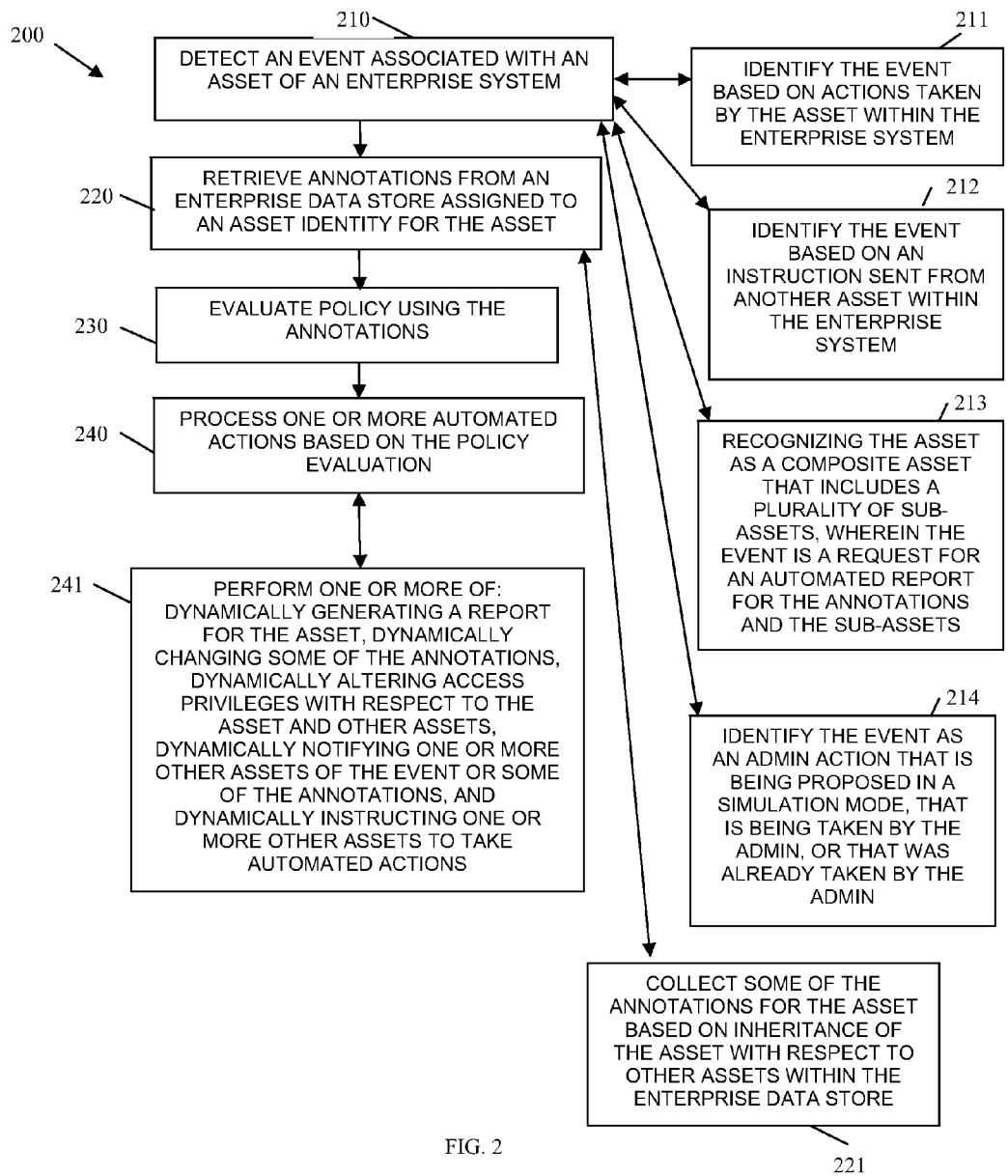
FIG. 2 is a diagram of a method for utilizing an automated risk assessment and management infrastructure, according to an example embodiment.
Figure 3:
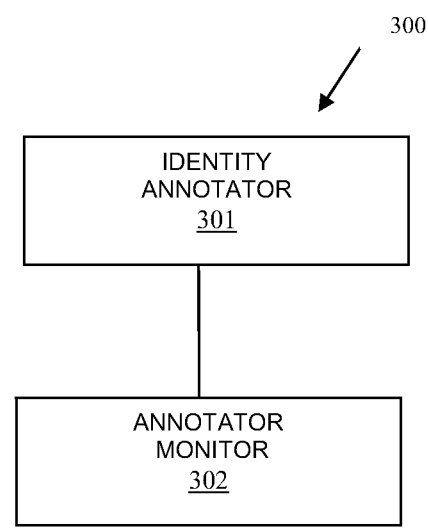
FIG. 3 is a diagram of an automated risk assessment and management system, according to an example embodiment.

It is within this context that embodiments of the invention are now discussed within the context of the FIGS. 1-3.

FIG. 1 is a method 100 for providing an automated risk assessment and management infrastructure, according to the techniques presented herein. The method 100 (hereinafter referred to as "identity annotator") is implemented, programmed, and resides within a non-transitory computer-readable storage medium for execution on one or more processors (hardware processors) of a network. The processors are specifically configured and programmed to execute the identity annotator. The network is wired, wireless, or a combination of wired and wireless.

At 110, the identity annotator assigns base annotations to an asset identity associated with an asset in an enterprise data store.

In an embodiment, the enterprise data store is a database, a data warehouse, a directory, or combinations of these things.

It is also noted that an asset can be a composite asset that includes other assets. For example, a workflow can be an asset and it can include a variety of other assets or sub-assets (such as machines, databases, users, etc.) from the perspective of the workflow. In this manner, the assets can be hierarchical or have relationships with one another. Additionally, as discussed more completely below because of these relationships (particularly hierarchical relationships), assets can inherit from one another.

According to an embodiment, at 111, the identity annotator automatically assigns the base annotations to the asset identity within the enterprise data store based on an asset type associated with the asset identity. For example, an asset identity of asset type "user" may have a base annotation of "TL=3," where TL stands for Threat Level and 3 indicates a fairly low threat level. After that user is associated with a role, which is another asset and carries its own base annotation "TP=15," where TP stands for Threat Potential and 15 indicating a rather high threat potential, the user's base annotation (TL=3) is combined through a mathematical formula (e.g. 0.5*TL+TP) with the role's base annotation (TP=15), such that now the user has a new annotation of TL=9. At the same time, the assigned role is now assigned a new annotation as well, because it is now an instantiated role (meaning that its powers are now being instantiated in a user/member), such that the role's new annotation is a mathematical combination of its own threat potential and its members threat level/profile (e.g. TP+TLm1+TLm2+TLmn/ m, where m is the number of members and TLmx is each members threat level), such that after the association the role now has two annotations "TP=15" and "TL=18."

In another case, at 112, the identity annotator receives the base annotation via an interface from an administrator. The interface may be the interface associated with the enterprise data store or another interface that interfaces on the backend to the enterprise data store. For example, the interface may be associated with an identity store that is carved out of the enterprise data store and has its own frontend interface, such that when an administrator sets up an asset or modifies an asset within the identity store the base annotations or some of the base annotations can be assigned. It is noted that some annotations can be inherited based on the assets relationship to other assets within the enterprise data store. Moreover, as noted above some annotations can be automatically assigned based on the type of asset. The embodiment of 112 provides an interface by which annotations for an asset can be manually assigned or manually overridden based on an automated assignment.

In yet another scenario, at 113, the identity annotator obtains the base annotations (or some of the initial base annotations) via Application Programming Interface (API) instructions from an automated service. So, applications can (with the proper access rights) assign and change base annotations within the enterprise data store. This can occur for a variety of situations and can be used with the other embodiments previously presented. For example, suppose that an administrator using an interface at 112 to change a base annotation for a workflow and that a variety of other assets that are part of the workflow asset inherit from the workflow; in such a situation, the manual change to the workflow asset can precipitate an automated application to change the inherited base annotations for the assets that inherit from the workflow asset. It is also noted that a variety of other situations can occur, some of which are discussed below, where automated applications or processing makes base annotation assignments for assets within the enterprise data store.

According to an embodiment, at 114, the identity annotator may represent the base annotations as: a business value assigned to the asset, a threat value assigned to the asset, a role value assigned to the asset, and a risk value assigned for the asset. A threat value may differ from a risk value in that the threat value is the current perceived assessment of risk for that asset whereas the risk value is the potential perceived assessment of risk for the asset. Essentially, a threat value is kinetic whereas risk is potential. It is noted that other initial base values may be developed and implemented as well and these are a few that may be beneficially used with the teachings presented herein.

At 120, the identity annotator performs a predefined number of iterations against the initial base annotations. Each iteration calculates new annotations based at least in part on prior annotations, and for each iteration that level's new annotations are also assigned to the asset identity in the enterprise data store. It is also noted that for the first iteration of 120, the prior annotations are the base annotations and for subsequent iterations of 120 the prior iteration's new annotations are used as the prior annotations.

The processing at 120 represents the hierarchical nature and cumulative nature of the annotation processing. During any particular iteration, the calculations do not have to entirely rely on the prior assigned annotations; that is other business-defined calculations and metrics can also be used in resolving a particular iteration's annotations that get assigned to the asset identity.

The number of iterations correspond to the depth of the hierarchy being used by an organization for the annotation assignments to the asset identity. For example, consider an organization having a four-level hierarchy for the annotations identified as follows: level 1 is Business Value annotations; level 2 is Information Technology (IT) Role annotations; level 3 is Business Role annotations; and level 4 is User Account annotations. Suppose that the base level annotations assigned to a server machine asset is as follows: BV=2 and TL=3 where BV is the business value for the organization for the server machine (1=high, 2=medium, 3=low) and TL is the threat level for authorizations on the sever for the IT system as a whole (3=high, 2=medium, 1=low). So, in the example we have a server machine asset with base annotations indicating that it is of medium importance to the enterprise but access authorizations on it are of high value because of the potential for abuse if given those access rights. Continuing with this example, during an iteration at 120, the second level annotations are calculated using, partially perhaps, the base annotations to identity an IT System Role annotation; this is calculated as (BV*(sum of the TL authorizations)). Here, BV=2 and TL is 3 (but if there were multiple TL's in the example they would be summed); so, the ITSR (IT System Role annotation) becomes 6. Still continuing with the example for the third level of Business Role (BR) annotations, the processing at 120 may calculate the BR annotation the sum of ITSR (again 6 assuming just one ITSR for the asset). Finally, the fourth level User Account (UA) annotation may be calculated as (sum BR annotations/100). It is noted that for the summing operations it may be that multiple sub assets are part of the server machine assets such that their values for the TL, ITR, and BR annotations are summed in the calculations for the server machine. The annotations bubble up from the enterprise data store and each iteration can be customized based on the needs of an enterprise.

According to an embodiment, at 121, the identity annotator acquires a predefined calculation for each level of iteration where each predefined calculation is associated with a specific or particular annotation type. So, as in the previous example the calculations can be tailored to the annotation type being calculated and the type corresponds to a particular level of iteration or hierarchy for the annotations within the enterprise.

In one case, at 122, the identity annotator processes at least one calculation for at least one level of iteration to produce a particular new annotation associated with enterprise risk and assessment for the asset. This too was presented in the example above where a threat level annotation was calculated. The processing can also include risk level annotations with the threat level annotation; again risk is potential whereas threat is kinetic.

At 130, the identity annotator monitors the enterprise data store for the asset identity based on the base annotations and the new annotations to perform one or more automated actions. For example, automated workflow processing can be initiated, heat maps of risk for an asset generated, profiles of risk and threat for an enterprise generated, and a variety of other automated actions.

For example, at 131, the identity annotator processes at least one action that changes a particular new annotation based on detected asset actions for the asset within an enterprise system or enterprise network. Here, actions of the asset with respect to other assets can drive (based on policy evaluation) that certain annotations assigned to the asset be dynamically changed. Suppose a user (type of asset) is making a fifth attempt to access a Human Resources (HR) database for salary information (another type of asset) after having been granted access four prior times within a predefined period of time; policy evaluation of this scenario can drive the identity annotator to downgrade annotation related to access to HR database and can drive sending notifications to the user or other assets (administrator) regarding the actions of the user. This is but one example as a plethora of other circumstances can occur as well.

So as identified in the embodiment of 131 and at 132, the identity annotator changes access privileges for the asset with respect to another asset in response to the particular new annotation and the detected asset actions. In the example, the annotation providing the user (asset) with access to the HR database (another asset) is changed such that on the fifth attempt access by the user to the HR database is denied, until, for example, the user gets permission from yet another asset (the HR database admin or management).

Continuing with the embodiment of 131 and at 133, the identity annotator can also send a notification to one or more additional assets in response to the particular new annotation and the detected asset actions. In the example, a manager and the HR admin are electronically notified that the user is being denied access because of accessing the HR database more than N times in the predefined period of time. This may prompt a call from the admin or manager to the employee or may prompt the manager to initiate a workflow approval that automatically permits the access and yet again precipitates an automated change in the annotations of the user.

The identity annotator demonstrates how asset identities housed in an enterprise identity store can be annotated in a hierarchical manner with annotations that are bubbled up, inherited, and calculated to drive assignments of other annotations and to drive automated management, reporting, and actions within an enterprise system and/or enterprise network for purposes of automating the enterprise's assessment of risks. Moreover, reports can be generated from the infrastructure of identity annotations to use for compliance auditing internal to the organization or external to the organization (such as to governmental agencies, vendors of the organization, or even customers of the organization (perhaps desiring compliance reporting on security for the customer's assets being managed by the organization) etc.).

FIG. 2 is a diagram of a method 200 for utilizing an automated risk assessment and management infrastructure, according to an example embodiment. The method 200 (hereinafter "annotator monitor) is implemented, programmed, and resides within a non-transitory computer-readable medium that executes on one or more processors of a network. The processors are specifically configured and programmed to execute the annotator monitor. Moreover, the network may be wired, wireless, or a combination of wired and wireless.

The identity annotator, represented by the method 100 of the FIG. 1 above, presents a technique for providing and managing an identity annotated electronic infrastructure. The annotator monitor monitors the infrastructure to drive a variety of automated actions within an enterprise.

At 210, the annotator monitor detects an event associated with an asset of an enterprise. This event can be detected or raised in a variety of manners.

For example, at 211, the annotator monitor identifies the event based on actions being taken by the asset within the enterprise system. Such, as in the example above with respect to the FIG. 1, a user trying to access an HR database too many times within a predefined period of time (other situations can exist as well and this is presented for purposes of illustration only).

In another case, at 212, the annotator monitor identifies the event based on an instruction sent from another asset within the enterprise system. The instruction can be manually initiated, such as through an administrator using an interface that causes the event to be raised that affects the asset (such as a user, server machine, workflow, Virtual Machine, cloud, etc.). Alternatively, the instruction can be automatically initiated from an automated resource, such as a workflow, security system, etc.

In yet another situation, at 213, the annotator monitor recognizes the asset as a composite asset that includes a plurality of sub-assets (from the perspective of the composite asset) and the event is a request to generate an automated report for the annotations and their relationships to the asset and the sub-assets. For example, a cloud may be viewed as a composite asset and the event is for purposes of generating a risk profile for the cloud as a whole based on all its sub-assets and their annotations. This report may even dynamically change and be presented as a heat map showing specific sub-assets that may be raising an overall risk profile for the cloud, such that those assets can have security access rights reduced to improve the risk profile of the cloud. Again, this is but one example of one report as many others can be customized and generated with the teachings presented herein.

In another case, at 214, the annotator monitor identifies the event as an administrative action that is being proposed (not occurred) by an administrator in a simulation mode of operation for the annotator monitor; as an administrative action that is being taken; or as an action that was already taken. In the case of the a proposed administrative action, the annotator monitor is placed in a simulation mode where the event being proposed is used to simulate how the actions (identified with the simulation event) will effect an asset or the enterprise network/system as a whole if such a change is made. For example, the event may be a proposed action in simulation mode for changing the role of an asset, such as a security server; here, the annotator monitor simulates the threat and risk exposures by propagating the proposed annotation changes resulting from executing the role change without committing the annotations to the enterprise data store and the results can be presented to the administrator for the administrator to decide on whether to proceed with the action or whether to abandon the action.

At 220, the annotator monitor retrieves annotations from an enterprise data store (or identity store) that are to be assigned to or associated with an asset identity for the asset. Examples of annotations and how annotations are bubbled up and calculated for an asset were presented above with respect to the discussion of the method 100 for the FIG. 1.

According to an embodiment, at 221, the annotator monitor collects some of the annotations for the asset based on inheritance of the asset with respect to other assets within the enterprise data store. Again, the hierarchical nature and relationships between assets were presented and discussed above with respect to the discussion of the method 100 for the FIG. 1. It is noted that inheritance can be overridden based on policy so that it does not always occur for sub-assets of a composite asset. In this manner, policy conditions or profiles can selectively drive when annotations are inherited and when they are not to be inherited.

At 230, the annotator monitor evaluates policy using the annotations. Policy include enterprise conditions that are dynamically evaluated based on current metrics of the enterprise system, actions of the asset or other assets, and/or state of the asset, state of the enterprise system in view of the annotations.

At 240, the annotator monitor processes one or more automated actions based on the policy evaluation. So, suppose a policy states: if STATE of X is Y and annotation Z for N is A then do B. Here, X may be a particular asset (can be enterprise system as a whole in the case where X is a composite asset); Y is a predefined known state value for X; STATE is the current computed state for X; Z is a currently assigned annotation for asset N; A is a predefined annotation; and B is an automated instruction (can fork an entire workflow or part of a workflow). This is but one example to show how policies can be implemented to be evaluated and drive automated actions within the enterprise with no manual intervention.

According to an embodiment, at 241, the annotator monitor can perform a variety of automated actions that are defined via the policies, such as but not limited to: generating a report for the asset, dynamically changing some of the annotations, dynamically altering access privileges with respect to the asset and/or other assets, dynamically notifying one or more other assets of the event and/or some of the annotations, and/or dynamically instructing one or more other assets to take automated actions. It is noted that some automated actions may themselves trigger a variety of subsequent actions, such as when an automated action initiated is a workflow.

FIG. 3 is a diagram of an automated risk assessment and management system 300, according to an example embodiment. The components of the automated risk assessment and management system 300 are implemented within and reside within a non-transitory and computer or processor-readable storage medium for purposes of executing on one or more processors of a network. The network may be wired, wireless, or a combination of wired and wireless.

The automated risk assessment and management system 300 implements, inter alia, various aspects of the method 100 and the method 200 of the FIGS. 1 and 2, respectively.

The automated risk assessment and management system 300 includes an identity annotator 301 and an annotator monitor 302. Each of these components and their interactions with one another will now be discussed in detail.

The identity annotator 301 is implemented, programmed, and resides within a non-transitory computer-readable storage medium and executes on one or more processors of the network. The processors are specifically configured to process the identity annotator 301. Example processing associated with the identity annotator 301 was presented above with respect to the method 100 of the FIG. 1.

The identity annotator 301 is configured to hierarchically annotate asset identities for assets of an enterprise with annotations. The phrase "hierarchically annotate" indicates that the identity annotator 301 uses lower level assignments of annotations to an asset identity to build higher level assignments of annotations for the asset identity. It is noted, that other calculations independent of the lower level assignments can also be used in formulating the higher level annotation assignments. Examples of this hierarchical processing where annotations are essentially bubbled up within the infrastructure or the enterprise system were presented above.

According to an embodiment, the identity annotator 301 is also configured to permit some annotations for some assets to be inherited from other assets. So, suppose an asset identity has a role annotation for a specific server machine, that server machine may be part of a cloud processing environment, such that the server machine inherits annotations associated with the cloud processing environment (another asset type having its own asset identity). Because the annotations are hierarchical they can be inherited in this manner. However, it is noted that in some cases inheritance may not be desired and attributes associated with the assets and/or policy can indicate when inheritance is or is not to occur. Moreover, inheritance can occur in a selective manner. For example, only predefined annotations for a system asset may be inherited by some sub-system assets. Thus, the degree and level of inheritance can be configured within the enterprise network via policy and/or attributes associated with the assets that provide the inheritance and assets that are the recipients of the inheritance.

The annotator monitor 302 is implemented, programmed, and resides within a non-transitory computer-readable storage medium and executes on one or more processors of the network. The processors are specifically configured to process the annotator monitor 302. Example processing associated with the annotator monitor 302 was presented above with respect to the method 200 of the FIG. 2.

The annotator monitor 302 is configured to monitor events of the enterprise system to evaluate the annotations in view of policy and to take no, one, or more automated actions based on the policy evaluation.

According to an embodiment, the annotator monitor 302 is configured to change, delete, and/or add a number of the annotations for a particular asset based on a particular detected event. So, the annotations for any given asset can be continuously and dynamically updated based on events. These events can be: manual instructions from administrators; automated instructions sent dynamically and automatically from other assets; events associated with policy evaluation based on actions of the asset, which is having annotations altered; actions of the enterprise system as a whole; and/or actions of other unrelated assets. Policy can drive what events to detect and what annotations to alter and the policy is configurable by the enterprise.

In another situation, the annotator monitor 302 is configured to perform automated actions for: dynamically generating interactive reports (reports that can be interacted with changed and dynamically updated); dynamically change security within the enterprise system; dynamically instruct some assets to take specific automated actions; and/or dynamically notify human or automated assets of the events. Here again, the automated actions are preformed based on policy evaluation.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method for automated security processing, the method implemented in a non-transitory machine-readable storage medium as executable instructions that are processed by one or more processors configured to perform the method, comprising:
    assigning, by the one or more processors, base annotations to a resource identity associated with a resource in an enterprise data store and identifying the resource as a resource type that is one of:
        a service, a system, a device, a directory, a data store, a workflow, a workload, and combinations and collections thereof, and wherein assigning further includes assigning each base annotation as a name-value pair to the resource identity, each base annotation having a name portion that identifies an annotation type and a value portion, and identifying each name-value pair as one of:
        a business-value name and a business value, a threat-level name and a threat-level value, a threat-potential name and a threat-potential value, a role name and a role value, and an asset name and a risk value assigned to that asset name, each value assigned according to a predefined scale for the corresponding annotation type;
    performing, by the one or more processors, a number of iterations, the number of iterations is a depth of a hierarchy used for annotating assignments of enterprise resources and each iteration calculating new annotations using the value portions of the name-value pairs, and each iteration based at least in part on the value portions of prior annotations and the new annotations assigned to the resource identity in the enterprise data store, wherein for a first iteration the base annotations are the prior annotations, wherein the hierarchy is for available annotations within an enterprise, wherein calculating further includes summing the value portions for same annotation types during each iteration to arrive at revised total annotation type values; and
    monitoring, by the one or more processors, the enterprise data store for the resource identity based on the base annotations and the new annotations to perform one or more automated actions, wherein monitoring further includes dynamically changing security within an enterprise system for the resource type based on the revised total annotation type values and dynamically providing automated security processing.

2. The method of claim 1, wherein assigning further includes automatically assigning the base annotations to the resource identity based on the resource type associated with the resource asset identity in the enterprise data store.

3. The method of claim 1, wherein assigning further includes receiving the base annotations via an interface from an administrator.

4. The method of claim 1, wherein assigning further includes obtaining the base annotations via Application Programming Interface (API) instructions from an automated service.

5. The method of claim 1, wherein performing further includes acquiring a predefined calculation for each level of iteration, each predefined calculation associated with a particular annotation type.

6. The method of claim 1, wherein performing further includes processing at least one calculation for at least one level of iteration to produce a particular new annotation associated with enterprise risk assessment for the resource.

7. The method of claim 1, wherein monitoring further includes processing at least one action that changes a particular new annotation based on detected resource actions of the resource within an enterprise network.

8. The method of claim 7, wherein processing further includes changing access privileges for the resource with respect to another resource in response to the particular new annotation and the detected resource actions.

9. The method of claim 7, wherein processing further includes sending a notification to one or more additional resources in response to the particular new annotation and the detected resource actions.

* * * * *

UNITED STATES PATENT AND TRADEMARK OFFICE
CERTIFICATE OF CORRECTION

PATENT NO. : 9,754,225 B2  Page 1 of 1
APPLICATION NO. : 13/053503
DATED : September 5, 2017
INVENTOR(S) : Worwetz et al.

It is certified that error appears in the above-identified patent and that said Letters Patent is hereby corrected as shown below:

On the Title Page

In item (75), in "Inventors", in Column 1, Line 1, delete "NY" and insert --NH-- therefor Signed and Sealed this
Fourteenth Day of April, 2020

Andrei Iancu
*Director of the United States Patent and Trademark Office*